United States Patent
Cho et al.

(10) Patent No.: US 12,157,467 B2
(45) Date of Patent: Dec. 3, 2024

(54) DRIVING ASSIST METHOD AND DRIVING ASSIST DEVICE FOR DETECTING CUT-IN VEHICLE WHEN HOST VEHICLE IS STOPPED

(71) Applicant: Nissan Motor Co., Ltd., Yokohama (JP)

(72) Inventors: Kibum Cho, Kanagawa (JP); Masahiro Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/632,250

(22) PCT Filed: Aug. 28, 2020

(86) PCT No.: PCT/JP2020/032625
§ 371 (c)(1),
(2) Date: Feb. 2, 2022

(87) PCT Pub. No.: WO2022/044266
PCT Pub. Date: Mar. 3, 2022

(65) Prior Publication Data
US 2022/0266830 A1  Aug. 25, 2022

(51) Int. Cl.
*B60W 10/06* (2006.01)
*B60W 10/184* (2012.01)
(Continued)

(52) U.S. Cl.
CPC ........... *B60W 30/165* (2013.01); *B60W 30/09* (2013.01); *B60W 2520/04* (2013.01); *B60W 2554/4046* (2020.02); *B60W 2555/60* (2020.02)

(58) Field of Classification Search
CPC .......... B60W 30/165; B60W 2555/60; B60W 2554/4046; B60W 30/09; B60W 2520/04
See application file for complete search history.

(56) References Cited

U.S. PATENT DOCUMENTS

2013/0226433 A1* 8/2013 Tominaga ............. B60W 30/16
701/96
2015/0032362 A1* 1/2015 Goudy ................ B60W 30/095
701/301
(Continued)

FOREIGN PATENT DOCUMENTS

JP   H11-321379 A   11/1999
JP   2000-172997 A   6/2000
(Continued)

OTHER PUBLICATIONS

Extended European Search Report of Dec. 5, 2023 of corresponding European Patent Application No. 1 20946539.2.
(Continued)

*Primary Examiner* — Jess Whittington
*Assistant Examiner* — Rami Nabih Bedewi
(74) *Attorney, Agent, or Firm* — Global IP Counselors, LLP

(57) ABSTRACT

A driving assist device includes a camera and a controller. The camera detects the presence of another vehicle ahead of a host vehicle. The controller sets a detection field of the camera. The controller determines that another vehicle has cut in front of the host vehicle if a degree to which the other vehicle has entered into the detection field exceeds or equals a first prescribed value when the host vehicle is traveling, or the other vehicle has cut in front of the host vehicle if the degree exceeds or equals a second prescribed value that is smaller than the first prescribed value when the host vehicle is stopped.

6 Claims, 12 Drawing Sheets

(51) Int. Cl.
*B60W 10/20* (2006.01)
*B60W 30/09* (2012.01)
*B60W 30/16* (2020.01)
*B60W 30/165* (2020.01)
*B60W 30/17* (2020.01)

(56) References Cited

U.S. PATENT DOCUMENTS

| | | | | |
|---|---|---|---|---|
| 2016/0103212 | A1* | 4/2016 | Nath | G01S 13/04 |
| | | | | 342/28 |
| 2019/0143968 | A1* | 5/2019 | Song | B60W 10/18 |
| 2020/0114921 | A1* | 4/2020 | Simmons | B60W 30/18163 |
| 2020/0402408 | A1* | 12/2020 | Kobayashi | G05D 1/695 |
| 2021/0192955 | A1* | 6/2021 | Kang | B60W 50/14 |
| 2021/0271241 | A1* | 9/2021 | Haggblade | G06N 3/045 |
| 2021/0387621 | A1* | 12/2021 | Takano | B60W 30/165 |
| 2022/0055618 | A1* | 2/2022 | Toyoda | B60W 40/04 |

FOREIGN PATENT DOCUMENTS

| | | |
|---|---|---|
| JP | 2004-82942 A | 3/2004 |
| JP | 2008-117073 A | 5/2008 |
| JP | 2010-38731 A | 2/2010 |
| JP | 2016-45709 A | 4/2016 |
| WO | 2017/009940 A1 | 1/2017 |

OTHER PUBLICATIONS

Extended European Search Report of Dec. 5, 2023 of corresponding European Patent Application No. 20946539.2.

* cited by examiner

DRIVING ASSIST METHOD AND DRIVING ASSIST DEVICE FOR DETECTING CUT-IN VEHICLE WHEN HOST VEHICLE IS STOPPED

CROSS-REFERENCE TO RELATED APPLICATIONS

This application is a U.S. national stage application of International Application No. PCT/JP2020/032625, filed on Aug. 28, 2020.

BACKGROUND

Technical Field

The present invention relates to a driving assist method and a driving assist device.

Background Information

An invention to cause a host vehicle to autonomously follow a preceding vehicle is known from International Publication No. 2017/009940 (Patent Document 1). In the invention disclosed in Patent Document 1, when a host vehicle is stopped at a traffic light, the number of start requests is detected, and a start approval period is set in accordance with the detected number of start requests.

SUMMARY

When the host vehicle is stopped, it is desired to detect vehicles that may cut in front of the host vehicle.

In view of the problem described above, an object of the present invention is to provide a driving assist method and a driving assist device that are capable of detecting vehicles that may cut in front of the host vehicle when the host vehicle is stopped.

In a driving assist method according to one aspect of the present invention, the detection field of a sensor is set in front of a host vehicle; when the host vehicle is traveling, it is determined that another vehicle has cut in front of the host vehicle if the degree to which the other vehicle has entered into the detection field exceeds or equals a first prescribed value, and when the host vehicle is stopped, it is determined that the other vehicle has cut in front of the host vehicle if the degree exceeds or equals a second prescribed value that is smaller than the first prescribed value.

By means of the present invention, it becomes possible to detect vehicles that may cut in front of a host vehicle when the host vehicle is stopped.

BRIEF DESCRIPTION OF THE DRAWINGS

Referring now to the attached drawings which form a part of this original disclosure.

FIG. 2 is a diagram showing one example of a method for detecting a cut-in.

FIG. 3 is a diagram showing another example of a method for detecting a cut-in.

FIG. 4 is a diagram showing another example of a method for detecting a cut-in.

FIG. 5 is a diagram showing another example of a method for detecting a cut-in.

FIG. 6 is a diagram showing another example of a method for detecting a cut-in.

FIG. 7 is a diagram showing another example of a method for detecting a cut-in.

FIG. 9 is a diagram showing another example of a method for detecting a cut-in.

FIG. 10 is a diagram showing another example of a method for detecting a cut-in.

FIG. 11 is a diagram showing another example of a method for detecting a cut-in.

FIG. 12 is a diagram showing another example of a method for detecting a cut-in.

DETAILED DESCRIPTION OF EMBODIMENTS

Figure 1:
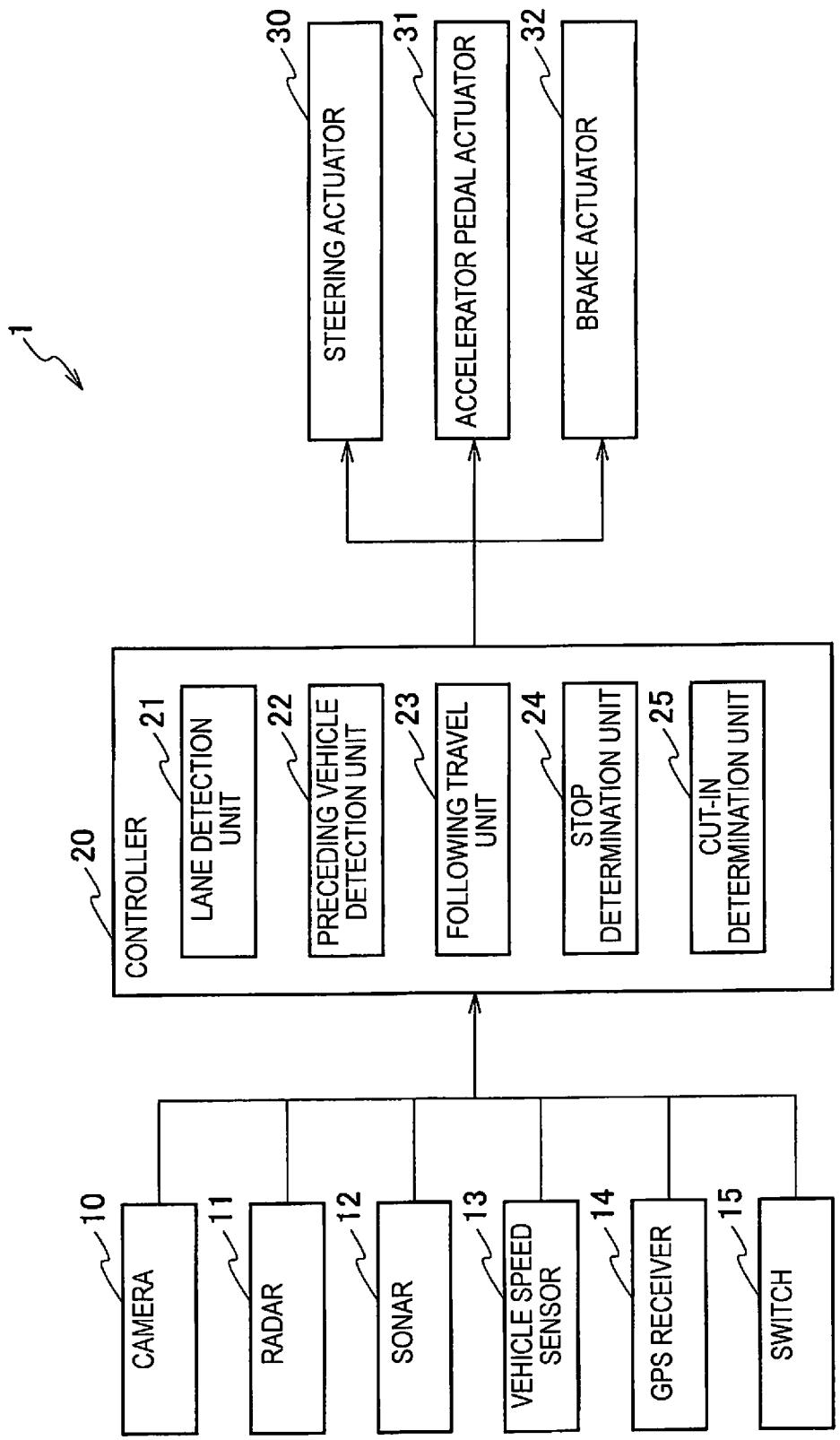
FIG. 1 is a block diagram of a driving assist device 1 according to an embodiment of the present invention.

An embodiment of the present invention is described below with reference to the drawings. In the descriptions of the drawings, identical parts have been assigned the same reference numerals, and their descriptions have been omitted.

A configuration example of a driving assist device 1 will be described with reference to FIG. 1. The driving assist device 1 is mounted on a host vehicle equipped with an autonomous driving function. The autonomous driving function includes ACC (Adaptive Cruise Control), lane keeping, automatic lane change, automatic parking, and the like, but in the present embodiment, the driving assist device 1 is primarily used for ACC. ACC is an autonomous driving function that automatically controls the acceleration/deceleration of a host vehicle, with the speed set in advance by a user as the upper limit, thereby causing the host vehicle to follow a preceding vehicle. Inter-vehicular distance control is also carried out so as to maintain an inter-vehicular distance corresponding to the speed set at this time.

Following control includes control for causing the host vehicle to follow a preceding vehicle after detecting the start of the preceding vehicle, when the host vehicle is stopped due to a traffic congestion, waiting for a traffic light, or the like.

As shown in FIG. 1, the driving assist device 1 comprises camera 10, radar 11, sonar 12, vehicle speed sensor 13, GPS receiver 14, switch 15, controller 20, steering actuator 30, accelerator pedal actuator 31, and brake actuator 32.

A plurality of the cameras 10 are provided on the front, sides, rear, side-view mirrors, and the like, of the host vehicle. The camera 10 comprises an imaging element, such as a CCD (charge-coupled device), CMOS (complementary metal oxide semiconductor), and the like. The camera 10 detects objects in the vehicle surroundings (pedestrians, bicycles, two-wheeled vehicles, other vehicles, and the like) as well as information pertaining to the vehicle surroundings (road boundary lines, traffic lights, signs, pedestrian crossings, intersections, and the like). The camera 10 outputs captured images to the controller 20.

A plurality of the radars 11 are provided on the front, sides, rear, etc., of the host vehicle. The radar 11 emits radio waves toward an object in the periphery of the host vehicle and measures the reflected waves, thereby measuring the distance and direction to the object. The radar 11 outputs the measurement data to the controller 20.

The sonar 12 is installed on the front bumper or the front grill. The sonar 12 emits ultrasonic waves and measures the reflected waves, thereby measuring the direction of and distance to an object in the vicinity (for example, about 1-2 m) of the host vehicle. The sonar 12 outputs measured data to the controller 20.

The vehicle speed sensor 13 detects the speed of the host vehicle and outputs the detected speed to the controller 20.

The GPS receiver 14 receives radio waves from a satellite to detect location information of the host vehicle on the ground. The location information of the host vehicle detected by the GPS receiver 14 includes latitude and longitude information. However, the method for detecting the host vehicle's location information is not limited to the use of a GPS receiver 14. For example, the location may be estimated using a method called odometry. Odometry is a method for estimating the host vehicle position by calculating the amount and direction of movement of the host vehicle in accordance with the rotation angle and the rotational angular velocity of the host vehicle. The location where the GPS receiver 14 is installed is not particularly limited, but the GPS receiver 14 may be installed, for example, in the instrument panel of the host vehicle. The GPS receiver 14 outputs the detected position information to the controller 20.

A plurality of the switches 15 are installed on the steering wheel. The plurality of switches 15 include a switch for selecting a radio channel, a switch for adjusting the volume, a switch for activating the ACC, a switch for adjusting the speed controlled by means of the ACC, a switch for setting the inter-vehicular distance when the ACC is activated, a switch for activating following travel when a preceding vehicle starts, and the like. The switches 15 are described as physical switches in the present embodiment, but the present invention is not limited thereto. The switches 15 may be virtual switches. If the switches 15 are virtual switches, the switches 15 may be displayed on a touch panel that is used for a navigation device.

The controller 20 is an electronic control unit (ECU) having a CPU (Central Processing Unit), a ROM (Read Only Memory), a RAM (Random Access Memory), a CAN (Controller Area Network) communication circuit, and the like. A computer program is installed in the controller 20 to cause it to function as the driving assist device 1. By executing the computer program, the controller 20 functions as a plurality of information processing circuits included in the driving assist device 1. Here, an example is shown in which the plurality of information processing circuits included in the driving assist device 1 is realized in software, but the information processing circuits may, of course, comprise dedicated hardware for executing each of the information processes shown below. In addition, the plurality of information processing circuits may be realized in discrete hardware. The controller 20 comprises, as the plurality of information processing circuits, a lane detection unit 21, a preceding vehicle detection unit 22, a following travel unit 23, a stop determination unit 24, and a cut-in determination unit 25.

The lane detection unit 21 uses an image acquired by the camera 10 to detect the lane in which the host vehicle is traveling. Specifically, the lane detection unit 21 extracts partition lines from the image and detects the lane in which the host vehicle travels. The lane detection unit 21 may further add the position information of the host vehicle in order to detect the lane in which the host vehicle is traveling.

The preceding vehicle detection unit 22 uses an image acquired by the camera 10 to detect the presence of a preceding vehicle in front of the host vehicle. In addition, the preceding vehicle detection unit 22 uses data acquired from the radar 11 to detect the inter-vehicular distance between the host vehicle and the preceding vehicle, the relative speed of the preceding vehicle with respect to the host vehicle, etc. In the present embodiment, a preceding vehicle is defined as a vehicle traveling in the same lane as the lane in which the host vehicle is traveling.

The following travel unit 23 controls the host vehicle such that the host vehicle travels autonomously, following a preceding vehicle. Specifically, when the user turns on a switch for activating the ACC, the following travel unit 23 controls the steering actuator 30, the accelerator pedal actuator 31, and the brake actuator 32, thereby causing the host vehicle to follow the preceding vehicle with the speed set in advance by the user as the upper limit. At this time, the following travel unit 23 also carries out inter-vehicular distance control so as to maintain an inter-vehicular distance that corresponds to the speed set at this time. The user may specify the inter-vehicular distance.

If a preceding vehicle is not detected when the user turns on a switch for activating the ACC, the following travel unit 23 causes the host vehicle to carry out constant speed travel at a set speed. If a speed is not set, the following travel unit 23 may cause the host vehicle to travel autonomously, with the legal speed limit of the road on which the host vehicle is currently traveling as the upper limit.

The stop determination unit 24 determines whether the host vehicle has stopped. Specifically, the stop determination unit 24 determines that the host vehicle has stopped when the speed of the host vehicle measured by the vehicle speed sensor 13 is 0 km/h.

The cut-in determination unit 25 determines whether another vehicle has cut in between the preceding vehicle and the host vehicle. The cut-in determination unit 25 determines cut-ins in a plurality of scenarios. For example, the cut-in determination unit 25 determines cut-ins between the host vehicle and a preceding vehicle when the host vehicle is autonomously traveling and following the preceding vehicle. In addition, the cut-in determination unit 25 determines cut-ins ahead of the host vehicle when the host vehicle is stopped at a traffic light, etc. Scenarios in which the host vehicle is stopped are twofold. One is a scenario in which the host vehicle is stopped behind a preceding vehicle. This scenario occurs in congested traffic, while waiting at a traffic light at an intersection, etc. The other is a scenario in which the host vehicle is stopped in a state in which there is no preceding vehicle. This scenario occurs when the host vehicle is stopped at the front of the line at an intersection.

Figure 2:
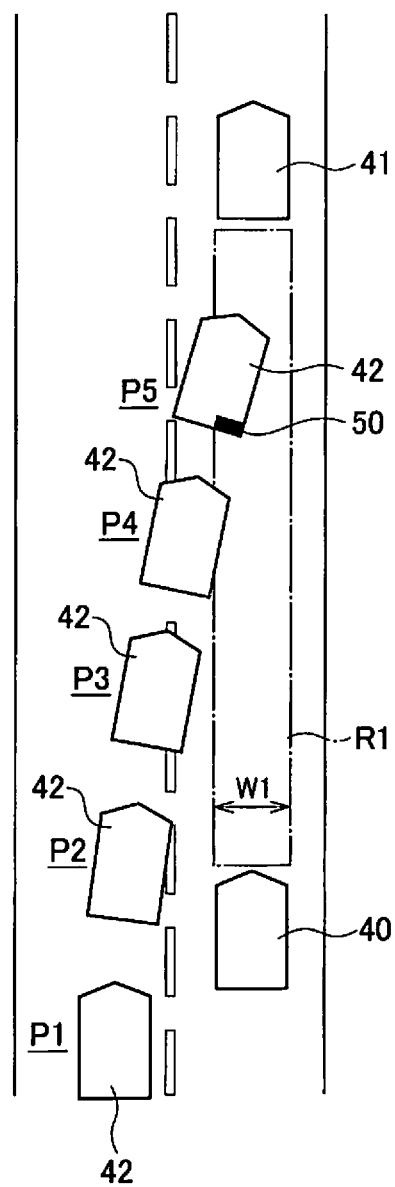
Figure 3:
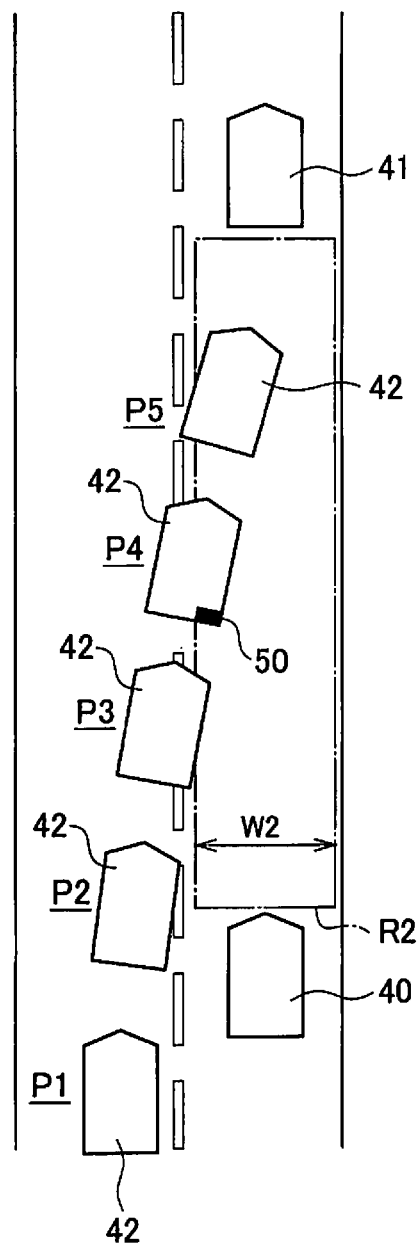

One example of a determination method of the cut-in determination unit 25 will be described with reference to FIGS. 2-4. The scenario of FIG. 2 shows a host vehicle 40 traveling autonomously and following a preceding vehicle 41. In addition, the scenario of FIG. 2 depicts an expressway, but is also applicable to roads other than expressways. R1 in FIG. 2 indicates an area for detecting another vehicle that cuts in between the preceding vehicle 41 and the host vehicle 40. Area R1 indicates the detection field of the camera 10. The size of area R1 will be described. The width in the vehicle width direction of area R1 is the vehicle width W1 of the host vehicle 40, as shown in FIG. 2. The length in the direction of travel of area R1 is measured from the front end of the host vehicle 40 to the rear end of the preceding vehicle 41.

P1-P5 in FIG. 2 indicate the positions of another vehicle 42. When the other vehicle 42 from position P1 cuts in between the host vehicle 40 and the preceding vehicle 41, the movement trajectory of the other vehicle 42 will be described by the gentle curve indicated by positions P2 to P5. As the other vehicle 42 proceeds from position P4 to position P5, the rear surface of the other vehicle 42 enters area R1. 50 in FIG. 2 indicates the part of the rear surface of the other vehicle 42 that has entered area R1 (hereinafter referred to as rear surface 50). The rear surface 50 is photographed by the camera 10. The cut-in determination unit 25 calculates the area of the rear surface 50 acquired by the camera 10. If the area of the rear surface 50 exceeds or equals a prescribed value, the cut-in determination unit 25 determines that the other vehicle 42 has cut in between the preceding vehicle 41 and the host vehicle 40. In other words, unless the area of the rear surface 50 exceeds or equals the prescribed value, the cut-in determination unit 25 determines that a vehicle has not cut in between the preceding vehicle 41 and the host vehicle 40.

A rear vehicle surface in the present embodiment is defined as a projected view of the vehicle as seen from behind. The prescribed value (third prescribed value) used for comparison with the area of the rear surface 50 is obtained by experimentation, simulation, etc.

The size of area R1 is not limited to that shown in FIG. 2. For example, as indicated by area R2 in FIG. 3, the width in the vehicle width direction may be the width W2 of the lane in which the host vehicle 40 is traveling. In this case, because the time it takes for the area of the rear surface 50 to exceed or equal the prescribed value is reduced, the cut-in determination unit 25 can determine a cut-in of the other vehicle 42 earlier as compared with the scenario shown in FIG. 2. Specifically, the cut-in determination unit 25 determines that the other vehicle 42 has cut in at position P5 in the scenario shown in FIG. 2, whereas the cut-in determination unit 25 determines that the other vehicle 42 has cut in at position P4 in the scenario shown in FIG. 3.

Figure 4:
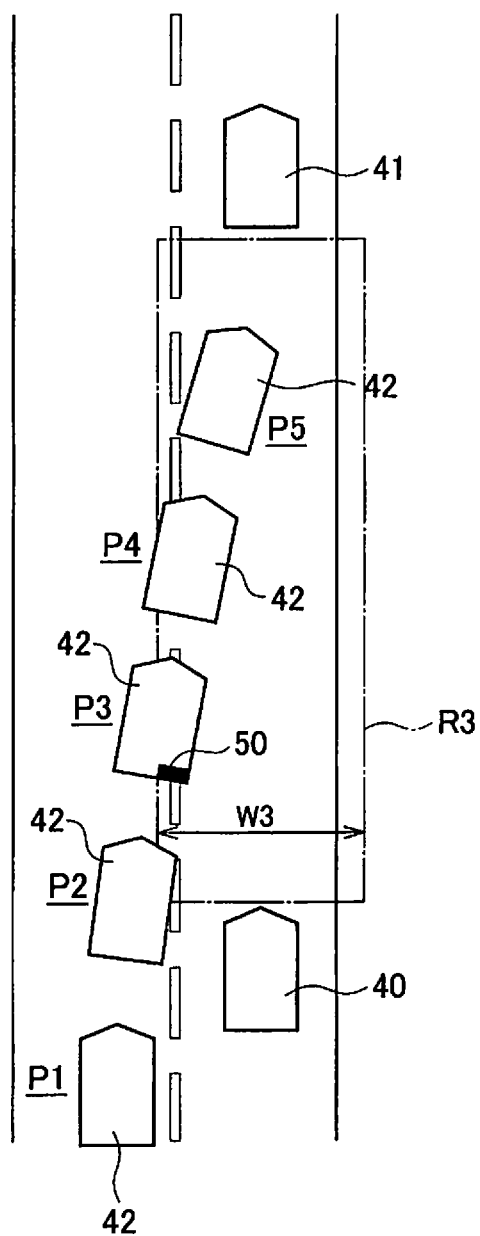

For example, as indicated by area R3 in FIG. 4, the width in the vehicle width direction may be the width W3, which is greater than the width W2. The width W3 is set in consideration of a margin. In the scenario shown in FIG. 4, because the time it takes for the area of the rear surface 50 to exceed or equal the prescribed value is further reduced, the cut-in determination unit 25 can determine a cut-in of the other vehicle 42 even earlier as compared with the scenario shown in FIG. 3. Specifically, the cut-in determination unit 25 determines that the other vehicle 42 has cut in at position P4 in the scenario shown in FIG. 3, whereas the cut-in determination unit 25 determines that the other vehicle 42 has cut in at position P3 in the scenario shown in FIG. 4.

A process carried out when a cut-in of the other vehicle 42 is detected in the scenarios shown in FIGS. 2-4 will be described next. If a cut-in of the other vehicle 42 is detected, the controller 20 issues a warning to the user riding in the host vehicle 40, decelerates the host vehicle 40, or the like. Alternatively, the controller 20 may cancel the following control. The warning may be by means of voice or a display on a monitor.

In the present embodiment, determining that the other vehicle 42 has cut in is synonymous with detecting a cut-in of the other vehicle 42.

One example of a method for determining a cut-in when the host vehicle 40 is stopped will now be described with reference to FIG. 5. In the scenario shown in FIG. 5, the preceding vehicle 41 and the host vehicle 40 are stopped at a traffic light. After the preceding vehicle 41 stops and it is determined that the inter-vehicular distance would become less than or equal to a prescribed value, the following travel unit 23 automatically stops the host vehicle 40. At this time, the following travel unit 23 maintains the stopped state.

When the host vehicle 40 is stopped, the cut-in determination unit 25 determines cut-ins by means of a different method than one used when the host vehicle 40 is traveling. Specifically, when the host vehicle 40 is traveling, the cut-in determination unit 25 uses the area of the rear surface 50 of the other vehicle 42, whereas when the host vehicle 40 is stopped, the cut-in determination unit 25 uses the area of a side surface 60 of the other vehicle 42. P1-P4 in FIG. 5 indicate the positions of the other vehicle 42. If the other vehicle 42 from position P1 cuts in between the host vehicle 40 and the preceding vehicle 41, the movement trajectory of the other vehicle 42 will be described by the curve indicated by positions P2 to P4. When the movement trajectory (curve) of the other vehicle 42 shown in FIG. 2 and the movement trajectory (curve) of the other vehicle 42 shown in FIG. 5 are compared, the curvature of the curve of FIG. 5 is greater. This is because the inter-vehicular distance between the host vehicle 40 and the preceding vehicle 41 is relatively long during travel, and thus the angle at which the other vehicle 42 enters into the host vehicle's lane (the lane in which the host vehicle 40 is traveling) is small; whereas when the inter-vehicular distance is short during the stopped state, that the angle at which the other vehicle 42 enters into the host vehicle's lane is greater.

As a result, the side surface 60 of the other vehicle 42 entering area R1 is more easily detected by the camera 10. In addition, the side surface 60 of the other vehicle 42 enters area R1 before the rear surface 50. Thus, in the present embodiment, when the host vehicle 40 is stopped, a cut-in is determined using the area of the side surface 60 of the other vehicle 42. It is thus possible to detect a cut-in earlier as compared with the case in which a cut-in is determined using the rear surface 50. Because the side surface 60 is used when the host vehicle 40 is stopped, it is possible to reduce erroneous detection of the side surface of a vehicle that travels along an adjacent lane on a curve. An adjacent lane means a lane adjacent to the lane in which the host vehicle 40 travels.

Figure 5:
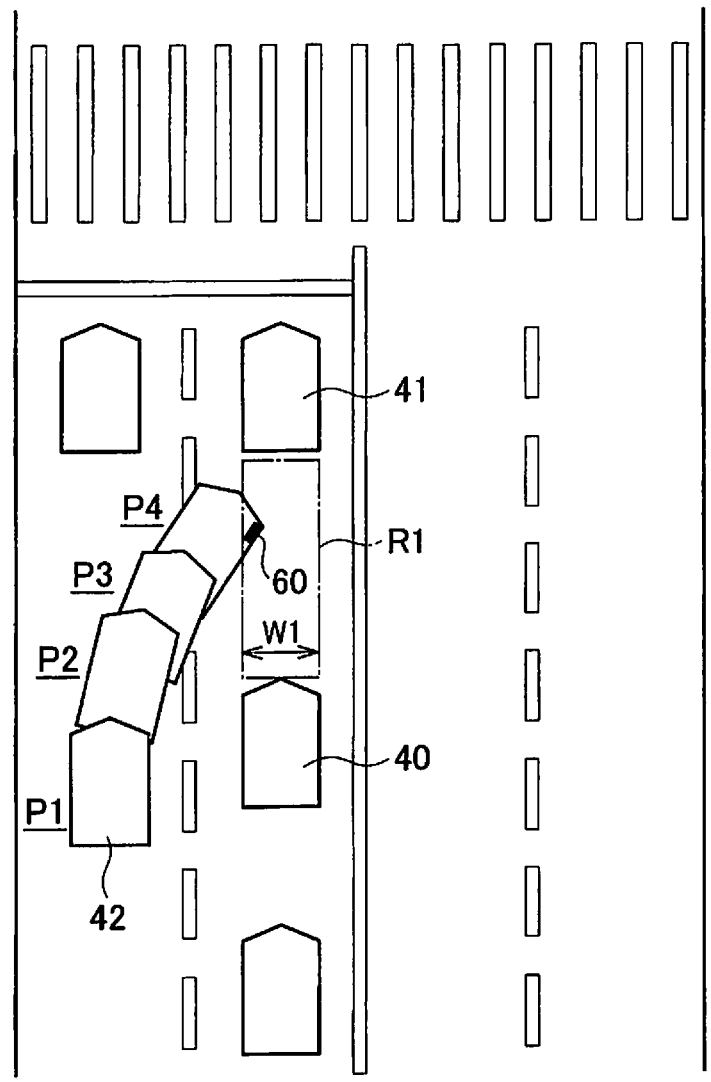

In the scenario shown in FIG. 5, if the other vehicle 42 proceeds from position P3 to position P4, the part of the side surface 60 of the other vehicle 42 enters area R1. The side surface 60 is photographed by the camera 10. The cut-in determination unit 25 calculates the area of the side surface 60 acquired from the camera 10. If the area of the side surface 60 exceeds or equals a prescribed value, the cut-in determination unit 25 determines that the other vehicle 42 has cut in between the preceding vehicle 41 and the host vehicle 40.

The side surface of a vehicle in the present embodiment is defined as a projected view of the vehicle as seen from side. The prescribed value (fourth prescribed value) used for comparison with the area of the side surface 60 may be the same value as the prescribed value (third prescribed value) used for comparison with the area of the rear surface 50 or a different value. The definition of the size of area R1 shown in FIG. 5 is the same as the definition of the size of area R1 shown in FIG. 2.

The size of area R1 is not limited that shown in FIG. 5. For example, as indicated by area R2 in FIG. 6, the width in the vehicle width direction may be the width W2 of the lane in which the host vehicle 40 is traveling. In this case, because the time it takes for the area of the side surface 60 to exceed or equal the prescribed value is reduced, the cut-in determination unit 25 can determine a cut-in of the other vehicle 42 earlier as compared with the scenario shown in FIG. 5. Specifically, the cut-in determination unit 25 determines that the other vehicle 42 has cut in at position P4 in the scenario shown in FIG. 5, whereas the cut-in determination unit 25 determines that the other vehicle 42 has cut in at position P3 in the scenario shown in FIG. 6.

Figure 6:
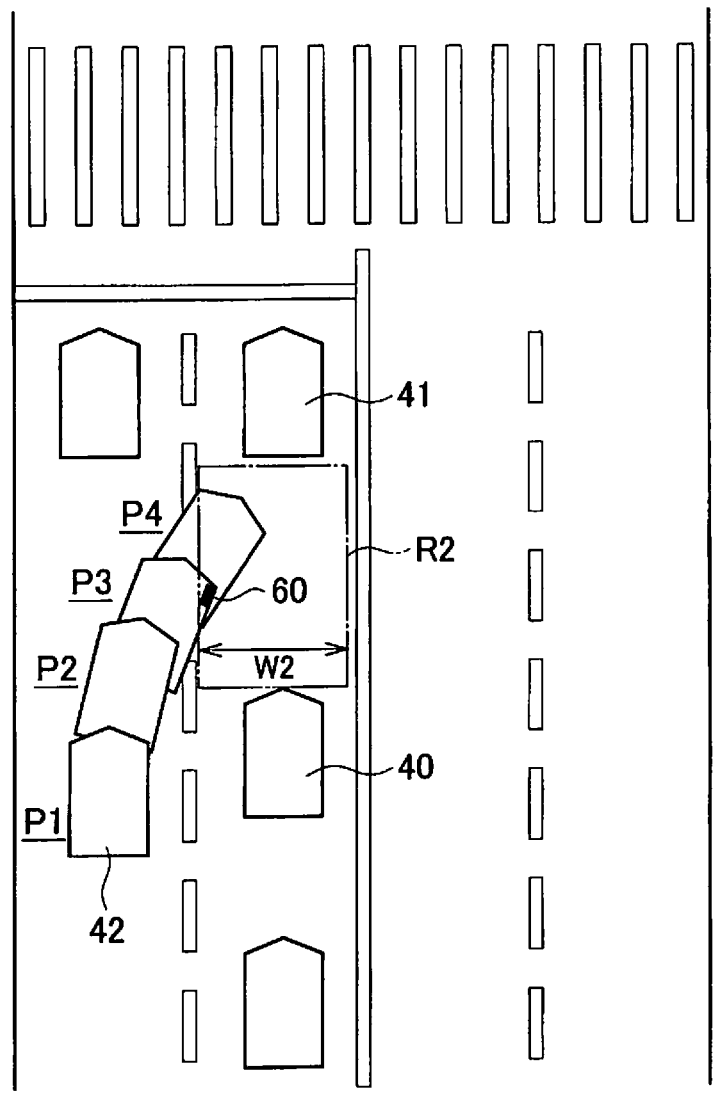
Figure 7:
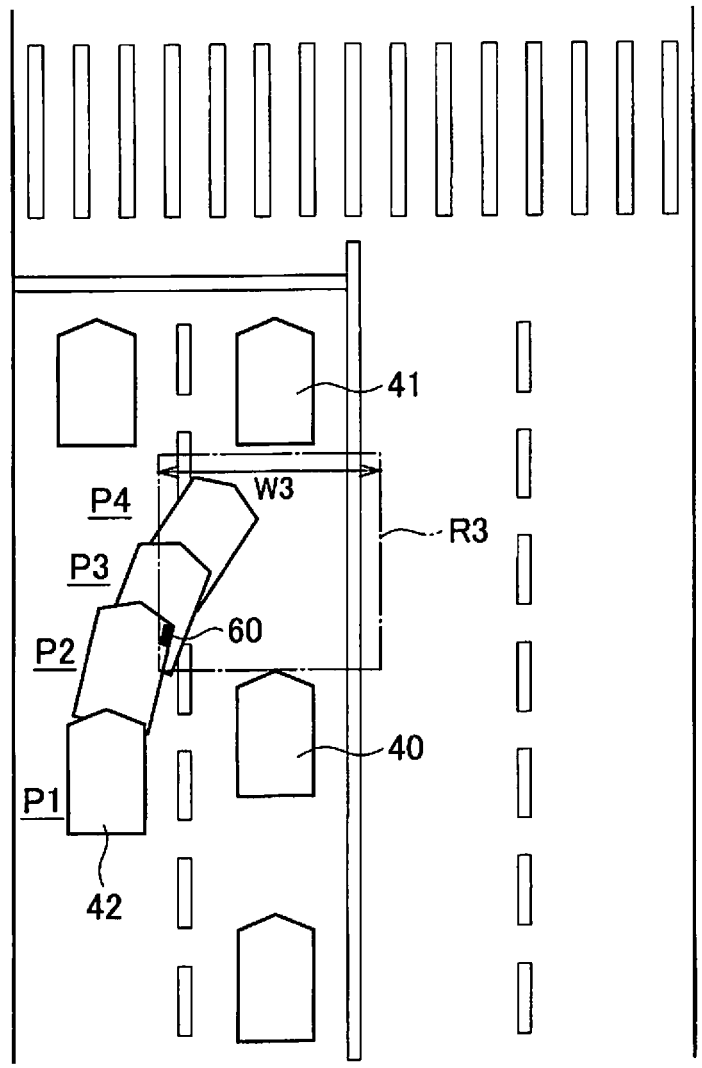

For example, as indicated by area R3 in FIG. 7, the width in the vehicle width direction may be the width W3, which is greater than the width W2. The width W3 is set in consideration of a margin. In the scenario shown in FIG. 7, because the time it takes for the area of the side surface 60 to exceed or equal the prescribed value is further reduced, the cut-in determination unit 25 can determine a cut-in of the other vehicle 42 even earlier as compared with the scenario shown in FIG. 6. Specifically, the cut-in determination unit 25 determines that the other vehicle 42 has cut in at position P3 in the scenario shown in FIG. 6, whereas the cut-in determination unit 25 determines that the other vehicle 42 has cut in at position P2 in the scenario shown in FIG. 7.

The process that is carried out when a cut-in of the other vehicle 42 is detected in the scenarios shown in FIGS. 5-7 will now be described. If a cut-in of the other vehicle 42 is detected, the following travel unit 23 prohibits a following start even if the user inputs a following start instruction. In this case, because the user cannot use the following start system, it is necessary for the user to manually start the host vehicle 40. It is thereby possible to start the host vehicle 40 after the user has checked the area ahead. The following travel unit 23 may issue a warning to the user when a following start is prohibited. When the preceding vehicle 41 starts and a cut-in of the other vehicle 42 is not detected, the following travel unit 23 automatically starts the host vehicle 40 in accordance with the user's following start instruction.

Figure 8:
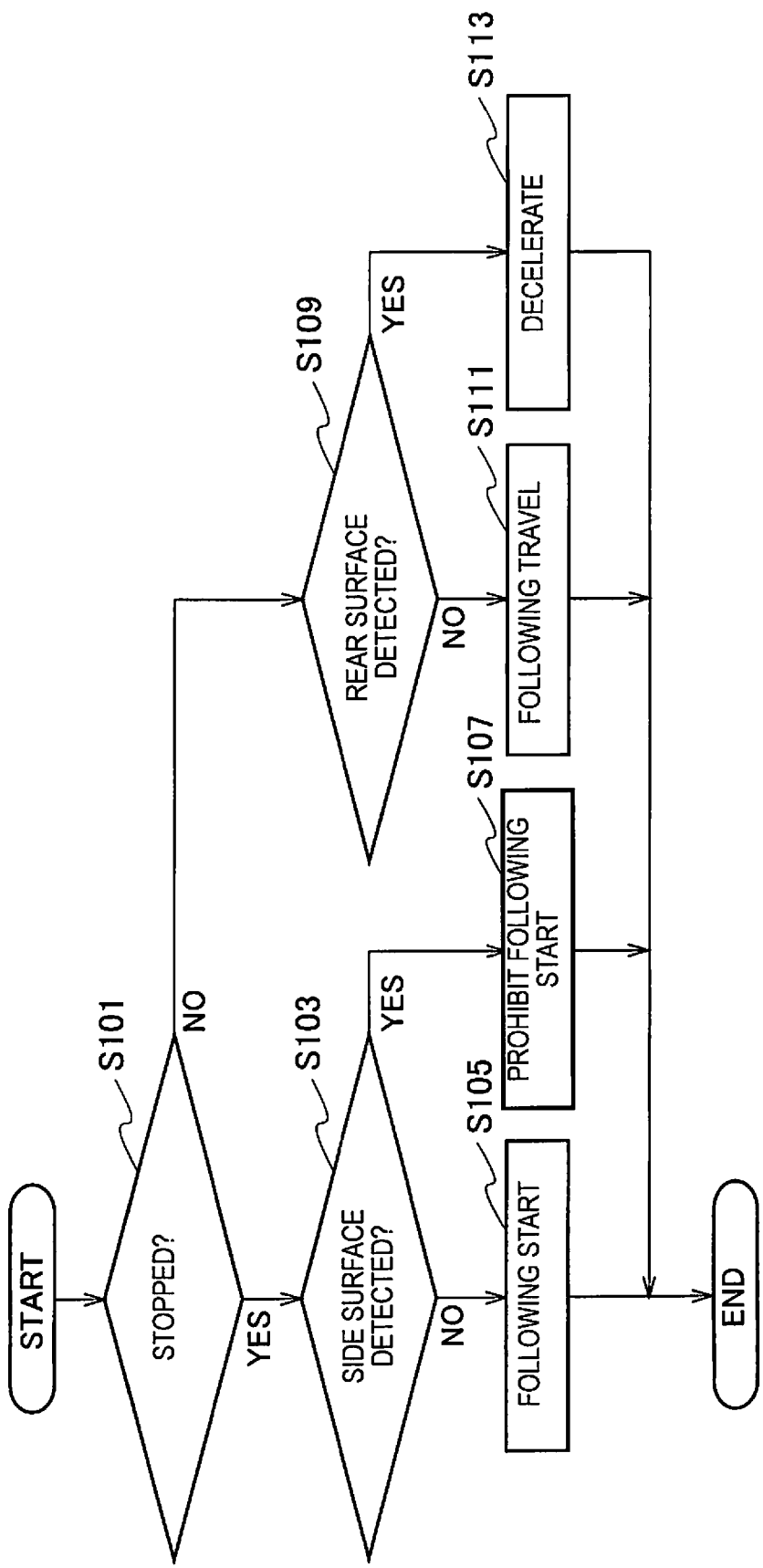
FIG. 8 is a flowchart explaining one operation example of the driving assist device 1.

One operation example of the driving assist device 1 will now be described with reference to the flowchart of FIG. 8.

In Step S101, the stop determination unit 24 uses the speed of the host vehicle 40 measured by the vehicle speed sensor 13 in order to determine whether the host vehicle 40 has stopped. If the speed of the host vehicle 40 is 0 km/h (YES is Step S101), the process proceeds to Step S103. When the speed of the host vehicle 40 is not 0 km/h (NO in Step S101), the process proceeds to Step S109.

In Step S103, the cut-in determination unit 25 calculates the area of the side surface 60 of the other vehicle 42 acquired from the camera 10. If the area of the side surface 60 exceeds or equals a prescribed value (YES in Step S103), the cut-in determination unit 25 determines that the other vehicle 42 has cut in between the host vehicle 40 and the preceding vehicle 41. The process then proceeds to Step S107, and the following travel unit 23 prohibits a following start. If, on the other hand, the area of the side surface 60 is smaller than the prescribed value (NO in Step S103), the cut-in determination unit 25 determines that a cut-in has not taken place. The process then proceeds to Step S105, and the following travel unit 23 automatically starts the host vehicle 40.

In Step S109, the cut-in determination unit 25 calculates the area of the rear surface 50 of the other vehicle 42 acquired from the camera 10. If the area of the rear surface 50 exceeds or equals a prescribed value (YES in Step S109), the cut-in determination unit 25 determines that the other vehicle 42 has cut in between the host vehicle 40 and the preceding vehicle 41. The process then proceeds to Step S113, and the controller 20 issues a warning to the user, decelerates the host vehicle 40, or the like. If, on the other hand, the area of the rear surface 50 is smaller than the prescribed value (NO in Step S109), the cut-in determination unit 25 determines that a cut-in has not taken place. The process then proceeds to Step S111, and the following travel unit 23 causes the host vehicle 40 to follow the preceding vehicle 41.

Action and Effects

As described above, the following actions and effects can be achieved by means of the driving assist device 1 according to the present embodiment.

The controller 20 sets the detection field (areas R1-R3) of a sensor (camera 10) for detecting another vehicle 42 between the host vehicle 40 and the preceding vehicle 41. If the host vehicle 40 is traveling and following the preceding vehicle 41 and the area of the rear surface 50 of the other vehicle 42 detected within the detection field exceeds or equals a prescribed value, the controller 20 determines that the other vehicle 42 has cut in between the preceding vehicle 41 and the host vehicle 40. The detection field is set between the host vehicle 40 and the preceding vehicle 41.

If the host vehicle 40 is stopped and the area of the side surface 60 of the other vehicle 42 detected in the detection field exceeds or equals a prescribed value, the controller 20 determines that the other vehicle 42 has cut in between the preceding vehicle 41 and the host vehicle 40. As described above, due to the difference in the characteristics between the traveling and stopped states (different angle of entry), when the host vehicle 40 is stopped, the side surface 60 of the other vehicle 42 entering the detection field is more easily detected by the camera 10. In addition, the side surface 60 of the other vehicle 42 enters the detection field before the rear surface 50. By determining a cut-in by means of the side surface 60, it is possible to detect a cut-in more quickly when the host vehicle 40 is stopped as opposed to when the host vehicle 40 is traveling.

The controller 20 may determine whether the host vehicle 40 is on an automobiles-only road based on location information of the host vehicle 40. An automobiles-only road is defined in Japan as a road dedicated for the exclusive use of automobiles on which only those automobiles designated by the road administrator are allowed to drive. A representative automobiles-only road is an expressway. The cut-in determination unit 25 may determine a cut-in only when it is determined that the host vehicle 40 is on an automobiles-only road. By determining cut-ins only on straight roads or curved roads of limited curvature, such as automobiles-only roads, erroneous cut-in determinations can be prevented.

If a cut-in of the other vehicle 42 is detected when the host vehicle 40 is traveling and following the preceding vehicle 41, the controller 20 issues a warning to the user, decelerates the host vehicle 40, or the like. If a cut-in of the other vehicle 42 is detected when the host vehicle 40 is stopped, the following travel unit 23 prohibits the host vehicle 40 from starting and following the preceding vehicle 41. By means of the present embodiment, because a cut-in can be quickly detected, sudden braking is reduced. In addition, it is possible to prevent a following start.

Modified Example 1

Another example of a determination method of the cut-in determination unit 25 will be described.

When the host vehicle 40 is traveling and following the preceding vehicle 41, the cut-in determination unit 25 may determine the presence or absence of a cut-in based on changes in the rear surface of the preceding vehicle 41 captured in a camera image. If the other vehicle 42 cuts in, part of the rear surface of the preceding vehicle 41 is obscured by the other vehicle 42 as seen by the camera 10. As a result, a change in the image of the rear surface of the preceding vehicle 41 occurs. If a change in the image of the rear surface of the preceding vehicle 41 occurs, the cut-in determination unit 25 may determine that the other vehicle 42 has cut in between the preceding vehicle 41 and the host vehicle 40.

If the host vehicle 40 is stopped behind the preceding vehicle 41 and the distance from the front end of the other vehicle 42 to the host vehicle 40 detected within the detection field of the camera 10 (areas R1-R3 shown in FIGS. 5-7) is less than or equal to a prescribed value, the cut-in determination unit 25 may determine that the other vehicle 42 has cut in between the preceding vehicle 41 and the host vehicle 40. The distance from the front end of the other vehicle 42 to the host vehicle 40 means the shortest distance between the host vehicle 40 and the bumper of the other vehicle 42. In addition, the prescribed value (fifth prescribed value) referred to here is different than the prescribed value (fourth prescribed value) that was used in comparisons with the side surface 60. By make a determination using this distance, a cut-in can be quickly detected.

Modified Example 2

The cut-in determination unit 25 may determine a cut-in of the other vehicle 42 in accordance with the degree of entry of the other vehicle 42 into the detection field of the camera 10. The degree of entry into the detection field is defined as the area of overlap of the other vehicle 42 with the detection field. The area of overlap of the other vehicle 42 with the detection field is defined as the area of overlap of the other vehicle 42 as seen directly overhead.

If the host vehicle 40 is traveling and it is determined that the degree of entry of the other vehicle 42 into the detection field exceeds or equals a prescribed value (first prescribed value), the cut-in determination unit 25 determines that the other vehicle 42 has cut in front of the host vehicle 40. In addition, if the host vehicle 40 is stopped and it is determined that the degree of entry of the other vehicle 42 into the detection field exceeds or equals a second prescribed value that is smaller than the first prescribed value, the cut-in determination unit 25 determines that the other vehicle 42 has cut in front of the host vehicle 40. Specific examples will be described with reference to FIGS. 2 and 5.

Note position P5 in FIG. 2 and position P4 in FIG. 5. The degree of entry of the other vehicle 42 into the detection field (area R1) at position P5 in FIG. 2 is about 50% of the total area as seen from above. And the degree of entry of the other vehicle 42 into the detection field (area R1) at position P4 in FIG. 5 is approximately 10% of the total area as seen from above. In Modified Example 2, if the host vehicle 40 is traveling and it is determined that the degree of entry of the other vehicle 42 into the detection field (area R1) exceeds or equals the first prescribed value (50%, as one example), the cut-in determination unit 25 determines that the other vehicle 42 has cut in front of the host vehicle 40. On the other hand, if the host vehicle 40 is stopped and it is determined that the degree of entry of the other vehicle 42 into the detection field (area R1) exceeds or equals a second prescribed value (10%, as one example) that is smaller than the first prescribed value, the cut-in determination unit 25 determines that the other vehicle 42 has cut in front of the host vehicle 40. The numerical values of 50% and 10% described above are merely examples, and no limitation thereto is implied. As long as the condition that the second prescribed value is smaller than the first prescribed value is satisfied, the numerical values of the first prescribed value and the second prescribed value may be any value.

By means of Modified Example 2, it becomes possible to detect the other vehicle 42 that may cut in front of the host vehicle 40 when the host vehicle 40 is stopped. In addition, the threshold value for determining a cut-in of the other vehicle 42 is smaller when the host vehicle 40 is stopped as opposed to when the host vehicle 40 is traveling. That is, because the second prescribed value is smaller than the first prescribed value, a cut-in can be more quickly detected when the host vehicle 40 is stopped as opposed to when the host vehicle 40 is traveling. Setting the second prescribed value smaller than the first prescribed value is similarly applied in the above-described embodiment, Modified Example 1, and Modified Example 3 described further below. That is, in the embodiment described above, the controller 20 sets the first prescribed value to the third prescribed value, which is the area of the rear surface of the other vehicle 42 detected with the detection field, and sets the second prescribed value to the fourth prescribed value, which is the area of the side surface of the other vehicle 42 detected within the detection field.

Modified Example 3

Figure 9:
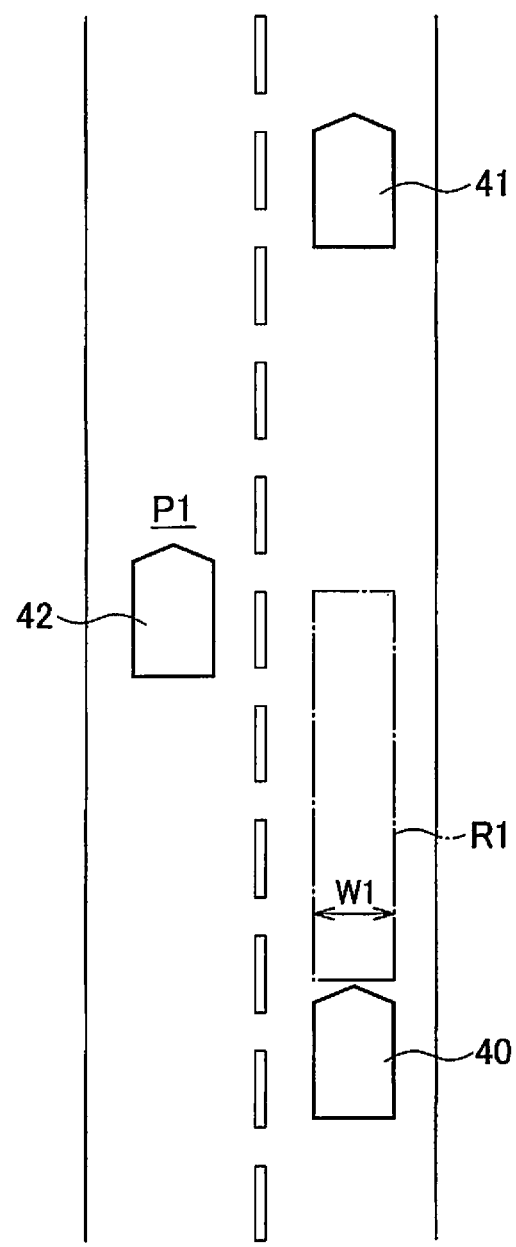

In the scenario of FIG. 2, the length of area R1 was described as the distance in the direction of travel from the front end of the host vehicle 40 to the rear end of the preceding vehicle 41. However, the length of area R1 is not limited thereto. As shown in FIG. 9, the length of area R1 may be a distance in the direction of travel that does not reach the rear end of the preceding vehicle 41. However, the length of area R1 is preferably greater than the distance in the direction of travel over which an emergency brake is applied by the autonomous driving function. It thus becomes possible to detect a cut-in before the emergency brake is applied.

Figure 10:
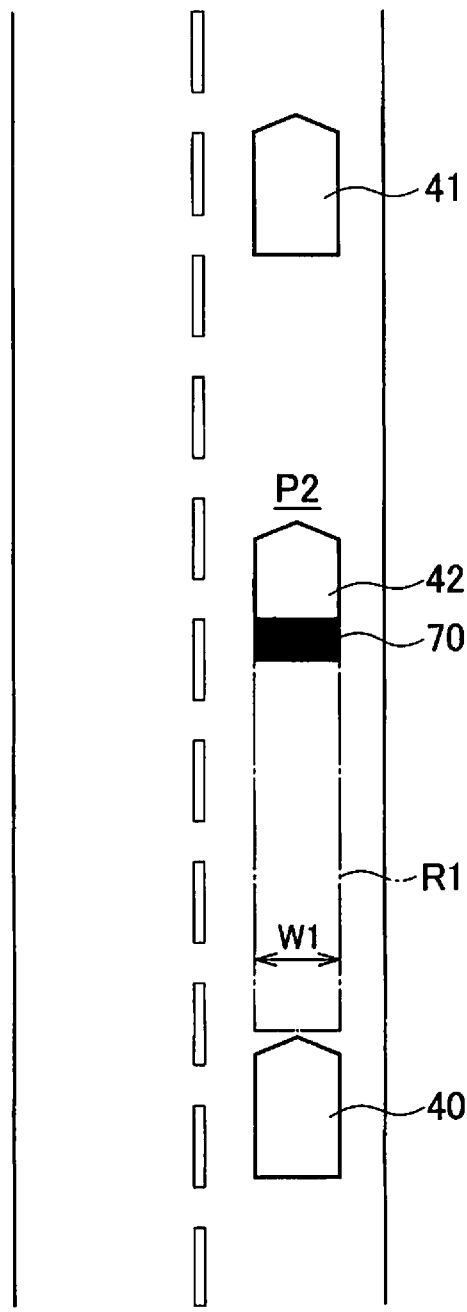

The method for determining a cut-in when area R1 is as shown in FIG. 9 will now be described. The scenario shown in FIG. 10 depicts the scenario of FIG. 9 at a subsequent time. In the scenarios of FIGS. 9-10, the host vehicle 40 is traveling. As shown in FIG. 10, when the host vehicle 40 is traveling and it is determined that the area of the rear surface of the other vehicle 42 detected within area R1 exceeds or equals a prescribed value (sixth prescribed value), the cut-in determination unit 25 determines that the other vehicle 42 has cut in front of the host vehicle 40. The area of the rear surface of the other vehicle 42 detected within area R1 means the area of overlap of the other vehicle 42 with area R1, as described in Modified Example 2.

Figure 11:
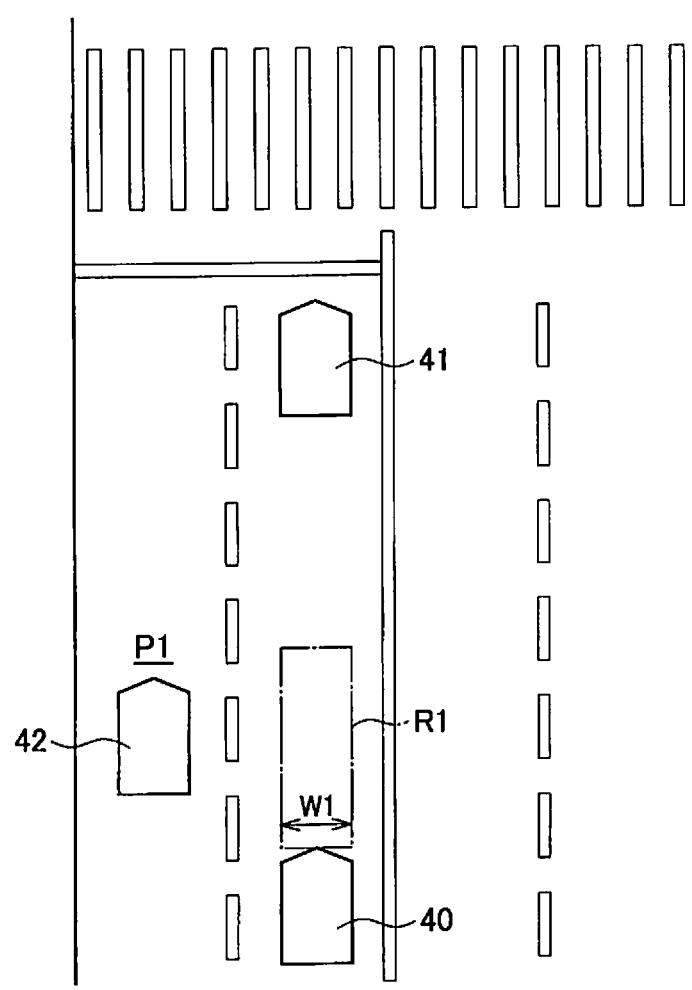
Figure 12:
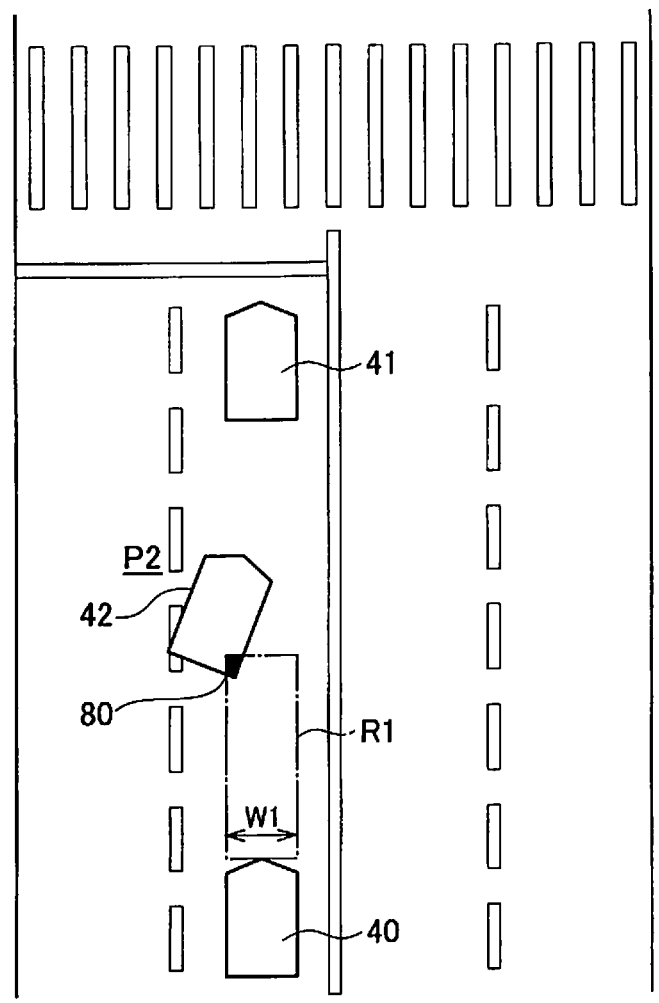

As shown in FIG. 11, the length of area R1 in the direction of travel when the host vehicle 40 is stopped also may be a length that does not reach the rear end of the preceding vehicle 41, in the same manner as in FIG. 9. However, in FIG. 11, as in FIG. 9, the length of area R1 in the direction of travel is preferably greater than the distance over which the emergency brake is applied by the autonomous driving function. The method for determining a cut-in when area R1 is as shown in FIG. 11 will now be described. The scenario shown in FIG. 11 is the scenario shown in FIG. 12 at a subsequent time. In the scenarios of FIGS. 11-12, the host vehicle 40 is stopped. As shown in FIG. 12, when the host vehicle 40 is stopped and it is determined that the area of the rear surface of the other vehicle 42 detected within area R1 exceeds or equals a seventh prescribed value that is smaller than the sixth prescribed value, the cut-in determination unit 25 determines that the other vehicle 42 has cut in front of the host vehicle 40. The area of the rear surface of the other vehicle 42 detected within area R1 means the area of overlap of the other vehicle 42 with area R1, as described in Modified Example 2.

By means of Modified Example 3, it becomes possible to detect when another vehicle 42 may cut in front of the host vehicle 40 when the host vehicle 40 is stopped. In addition, the threshold value for determining a cut-in of the other vehicle 42 is smaller when the host vehicle 40 is stopped as opposed to when the host vehicle 40 is traveling. That is, because the seventh prescribed value is smaller than the sixth prescribed value, a cut-in can be detected more quickly when the host vehicle 40 is stopped as opposed to when the host vehicle 40 is traveling.

Each of the functions described in the embodiments above may be implemented by means of one or more processing circuits. The processing circuits include programmed processing devices, such as processing devices including electronic circuits. Moreover, the processing circuits include devices such as circuit components and application-specific integrated circuits (ASIC) arranged to execute the described functions.

Embodiments of the present invention have been described above, but the descriptions and figures that form part of this disclosure should not be understood to limit the present invention. From this disclosure, various alternative embodiments, examples, and operating techniques should be apparent to those skilled in the art.

When the host vehicle 40 is stopped, lane markings (so-called white lines) may not be detected because of vehicles in the vicinity of the host vehicle 40. In such cases, the controller 20 may set the detection field of the camera 10 using virtual lane markings based on past detection results. The lane width of the virtual lane markings may be the vehicle width of the host vehicle 40, obtained by adding a margin to the vehicle width of the host vehicle 40, or may be a width in accordance with the road type.

The cut-in determination unit 25 may determine a cut-in based on the area of the side surface of the other vehicle 42. For example, when the host vehicle 40 is traveling and it is determined that the area of the side surface of the other vehicle 42 that overlaps in the detection field exceeds or equals a prescribed value (eighth prescribed value), it may be determined that the other vehicle 42 has cut in front of the host vehicle 40. In addition, when the host vehicle 40 is stopped and the area of the side surface of the other vehicle 42 that overlaps the detection field exceeds or equals a ninth prescribed value that is smaller than the eighth prescribed value, the cut-in determination unit 25 may determine that the other vehicle 42 has cut in front of the host vehicle 40. As a result, it is possible to detect a cut-in more quickly when the host vehicle 40 is stopped as opposed to when the host vehicle 40 is traveling.

The present invention can be applied irrespective of the presence or absence of preceding vehicle 41. That is, the driving assist device according to the present invention can detect another vehicle that cuts in front of the host vehicle 40 in a lane in which the host vehicle 40 is traveling irrespective of the presence or absence of preceding vehicle 41.

The invention claimed is:

1. A driving assist method using a controller and a sensor provided in a host vehicle, the driving assist method comprising:
   setting a detection region in an area in front of the host vehicle;
   determining whether the host vehicle is stopped or traveling;
   executing a cut-in determination to determine whether another vehicle has cut in front of the host vehicle, the cut-in determination including
   determining that the other vehicle has cut in front of the host vehicle when the host vehicle is traveling and a cut-in degree to which the other vehicle has entered into the detection region satisfies a first condition, and
   determining the other vehicle has cut in front of the host vehicle when the host vehicle is stopped and the cut-in degree satisfies a second condition different from the first condition,
   a width of the detection region being the same regardless of whether the host vehicle is traveling or stopped;
   executing one or more of the following controls when it is determined that the other vehicle has cut in front of the host vehicle while the host vehicle is traveling: controlling the host vehicle to issue a warning to a user of the host vehicle, controlling the host vehicle to decelerate, and controlling the host vehicle to cancel a following control of the host vehicle with respect to a preceding vehicle that is ahead of the host vehicle; and
   executing one or more of the following controls when it is determined that the other vehicle has cut in front of the host vehicle while the host vehicle is stopped: controlling the host vehicle to prohibit a following start and controlling the host vehicle to issue a warning to the user of the host vehicle,
   the first condition being that an area of a rear surface of the other vehicle detected within the detection region equals or exceeds a first prescribed value, the area of the rear surface being defined in a projected view of the other vehicle as seen from behind, and
   the second condition being that an area of a side surface of the other vehicle detected within the detection region equals or exceeds a second prescribed value, the area of the side surface being defined in a projected view of the other vehicle as seen from a lateral direction.

2. The driving assist method according to claim 1, further comprising:
   setting the detection region to be disposed between the host vehicle and the preceding vehicle when the host vehicle is executing the following control.

3. The driving assist method according to claim 1, wherein
   the detection region is set such that a length of the detection region in a direction of travel of the host vehicle is greater than a distance over which emergency braking is executed by an autonomous driving function.

4. The driving assist method according to claim 1, further comprising
   acquiring location information of the host vehicle,
   determining whether the host vehicle is on an automobiles-only road based on the location information, and
   only executing the cut-in determination upon determining that the host vehicle is on the automobiles-only road.

5. A driving assist device comprising:
   a sensor provided in a host vehicle, the sensor being configured to detect another vehicle ahead of the host vehicle; and
   a controller provided in the host vehicle configured to receive output from the sensor, the controller being configured to
   set a detection region in an area in front of the host vehicle,
   determine whether the host vehicle is stopped or traveling, execute a cut-in determination to determine whether the other vehicle has cut in front of the host vehicle, the cut-in determination including determining that the other vehicle has cut in front of the host vehicle when the host vehicle is traveling and a cut-in degree to which the other vehicle has entered into the detection region satisfies a first condition, and determining that the other vehicle has cut in front of the host vehicle when the host vehicle is stopped and the cut-in degree satisfies a second condition different from the first condition, a width of the detection region being the same regardless of whether the host vehicle is traveling or stopped, execute one or more of the following controls when it is determined that the other vehicle has cut in front of the host vehicle while the host vehicle is traveling: controlling the host vehicle to issue a warning to a user of the host vehicle, controlling the host vehicle to decelerate, and controlling the host vehicle to cancel a following control of the host vehicle with respect to a preceding vehicle that is ahead of the host vehicle, and execute one or both of the following controls when it is determined that the other vehicle has cut in front of the host vehicle while the host vehicle is stopped: controlling the host vehicle to prohibit a following start and controlling the host vehicle to issue a warning to the user of the host vehicle, the first condition being that an area of a rear surface of the other vehicle detected within the detection region equals or exceeds a first prescribed value, the area of the rear surface being defined in a projected view of the other vehicle as seen from behind, and the second condition being that an area of a side surface of the other vehicle detected within the detection region equals or exceeds a second prescribed value, the area of the side surface being defined in a projected view of the other vehicle as seen from a lateral direction.

6. A driving assist method using a controller and a sensor provided in a host vehicle, the driving assist method comprising:

setting a detection region in an area in front of the host vehicle;

determining whether the host vehicle is stopped or traveling;

executing a cut-in determination to determine whether another vehicle has cut in front of the host vehicle, the cut-in determination including determining that the other vehicle has cut in front of the host vehicle when the host vehicle is traveling and a cut-in degree to which the other vehicle has entered into the detection region satisfies a first condition, and determining the other vehicle has cut in front of the host vehicle when the host vehicle is stopped and the cut-in degree satisfies a second condition different from the first condition, a width of the detection region being the same regardless of whether the host vehicle is traveling or stopped;

executing one or more of the following controls when it is determined that the other vehicle has cut in front of the host vehicle while the host vehicle is traveling: controlling the host vehicle to issue a warning to a user of the host vehicle, controlling the host vehicle to decelerate, and controlling the host vehicle to cancel a following control of the host vehicle with respect to a preceding vehicle that is ahead of the host vehicle; and executing one or more of the following controls when it is determined that the other vehicle has cut in front of the host vehicle while the host vehicle is stopped: controlling the host vehicle to prohibit a following start and controlling the host vehicle to issue a warning to the user of the host vehicle, the first condition being that a ratio of an area of a portion of the other vehicle that is disposed in the detection region with respect to a total area of the other vehicle when viewed from above is equal to or larger than a first prescribed value, the second condition being that the ratio is equal to or larger than a second prescribed value, the second prescribed value being smaller than the first prescribed value.

* * * * *